(No Model.)
G. C. AVERY.
CORN PLANTER.
No. 358,638. Patented Mar. 1, 1887.
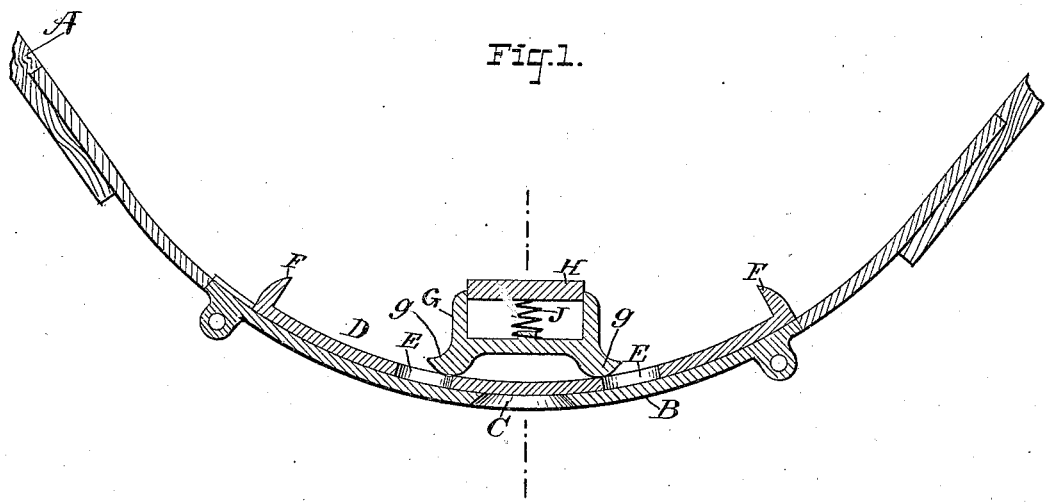
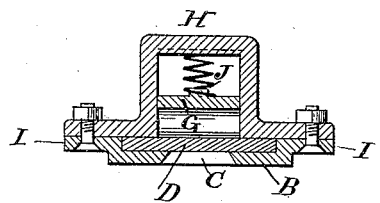

UNITED STATES PATENT OFFICE.

GEORGE C. AVERY, OF LOUISVILLE, KENTUCKY, ASSIGNOR TO B. F. AVERY & SONS, OF SAME PLACE.

CORN-PLANTER.

SPECIFICATION forming part of Letters Patent No. 358,638, dated March 1, 1887.

Application filed December 2, 1885. Serial No. 184,414. (No model.)

*To all whom it may concern:*

Be it known that I, GEORGE C. AVERY, of Louisville, in the county of Jefferson and State of Kentucky, have invented certain new and useful Improvements in Corn-Planters; and I do hereby declare that the following is a full, clear, and exact description thereof, reference being had to the accompanying drawings, making part of this application.

My present invention relates to an improvement on the dropping mechanism of that kind of seed-planter which is made the subject of another application for Letters Patent filed by me November 3, 1885, and now pending in the United States Patent Office.

In this kind or type of seed-dropping mechanism shown and described in my said pending application, and heretofore used by me, I have found in practice that the reciprocatory plate or device containing the pockets for carrying charges of seed to the seed exit or discharge orifice located beneath the said charger device is apt to have its seed-pockets overloaded with the seed and to have the latter get cut or bruised by or wedged in under the rigid device beneath which the reciprocatory charger travels, the result of which is not only the mutilation of the seed, but the creation of unnecessary friction, and hence an obstacle to the free and proper working of the moving devices. I propose by my present invention to overcome this serious difficulty; and to this main end and object my invention may be said to consist, essentially, in the use, in combination with the reciprocatory charger, of a yielding plate or device arranged over said charger, and having its lower or bearing surface curved slightly upward at either end, whereby any upwardly-projecting surplusage of seed in either of the pockets of the charger will, during the motion of said charger, easily ride or pass beneath the said yielding device, and, lifting it against a spring-pressure, will pass easily to the point at which the overcharged pocket of the charger will be emptied of its contents between the exit or discharge orifice of the bottom plate or bottom of the hopper, all as will be hereinafter more fully set forth, and as will be more particularly pointed out and defined in the claims of this specification.

To enable those skilled in the art to which my improvement relates to make and use the same, I will now proceed to more fully describe the construction and operation of a seed-planter embracing my said invention, referring by letters to the accompanying drawings, which form a part of this specification, and in which I have shown my said invention carried out in that form in which I have so far successfully practiced it, and which is the best form now known to me.

In the drawings, Figure 1 is a vertical longitudinal section through the center of the seed-dropping mechanism of a machine for planting corn and other seed. Fig. 2 is a detail vertical cross-section at the line $x\ x$ of Fig. 1.

In the two figures of the drawings the same part will be found designated by the same letter of reference.

A represents the usual hopper of any ordinary seed-planter, to which my invention may be applied.

B is the perforated bottom plate of the hopper, through the exit or discharge opening C of which the charges of seed make their escape.

Over the perforated plate B is arranged a reciprocatory plate or device, D, which is arranged to slide freely back and forth in a proper seat formed in the upper part of the plate B, and which is driven back and forth by any suitable means, (such, for instance, as shown in my other application, and which need not be described here.) This device D is formed with two perforations, E E, which constitute the chargers or pockets for the seed; and it also has upwardly-projecting flanges F F, against the outer surfaces of which strike the arms of the knocker device or driver of the seed-planter, and the inner surfaces of which act as stops against the holddown device G. This holddown device or covering-plate G is arranged centrally over the device D, as shown, and is held down in place by a cap-piece or strap, H, the lower flanged portions of which are bolted to the projections or ear-pieces I of the bottom plate of the seed-planter, all as clearly shown in the drawings. This holddown plate or device G is made and arranged, as shown, with a spiral spring, J, intermediate of its upper surface and the under surface of the holddown strap or cap H, so that the device G is capable of a limited extent of upward movement against the compressing tendency or tension of the spring J, and said device G is formed at either end of its bottom portion with upwardly-curved extensions, as seen at $g\ g$, for a purpose to be presently explained.

The general operation of the mechanism is substantially like that of the mechanism shown in my other application; but at each stroke of the reciprocatory charger D, and when the filled perforations or pockets of the latter pass beneath the cut-off or covering device G, any upwardly-projecting or protruding grains of seed which do not happen to be expelled from the pockets of the charger pass beneath the upwardly-curved or rocker-like extensions $g$ of the cut-off, and thus, instead of being either mutilated or mashed by contact with the edge of the cut-off, pass freely beneath the latter and operate to lift it against the action of the spiral spring J until the pocket of the plate D shall have arrived partially or wholly over the discharge-orifice of the bottom plate, B, when the free escape downwardly of the charge of seed permits the spiral spring to force down or again bring into its normal position the cut-off device G. By this means and in this manner it will be seen that not only is any liability of a mutilation of any of the seed prevented, but all resistance and undue friction, which would otherwise be caused by an overcharged pocket of the device D coming suddenly into forcible contact with the edge of an immovable cut-off or covering device, is entirely avoided, and thus the mechanism is rendered capable of running with less power and more satisfaction.

It will be seen that by the combination with the movable perforated charge-slide and its supporting perforated bottom plate, B, of a cut-off or covering device adapted to yield upwardly, as shown and described, any slightly upwardly-projecting kernels or seeds that may not be brushed out of the pockets of the sliding charger may pass beneath the cut-off on lifting it upwardly slightly, and will permit the overladen pocket to pass to its destination with less friction and with less injury to the seed than is possible in the case where a rigid or immovable cut-off or covering device is employed; and it will also be seen that by forming the device G with the upwardly-curved extensions or cam-like portion $g$, the free passage of any seed projecting above the plane of the top of the seed-pockets and the lifting of the yielding cut-off is very much facilitated. It will be understood, however, that the feature of the elastic or yielding cover G may be employed without the specific device or other feature of my invention that relates to the cam-like or upwardly-curved extensions $g$, and that therefore these separable features of my invention may be used separately, if desired, although I prefer to have them combined in one machine.

Having now so fully explained the nature and operation of my improved contrivance that those skilled in the art can make and use the same, what I claim as new, and desire to secure by Letters Patent, is—

1. In combination with the usual perforated bottom or bottom plate, B, of the hopper and the sliding perforated plate or charger D, the movable or yielding covering device G, holddown strap or cap-piece H, and spiral spring J, the whole constructed, arranged, and operating together in substantially the manner and for the purpose hereinbefore set forth.

2. In combination with the perforated plate B, the pocketed slide D, the holddown-strap H, and spiral spring J, the yielding cut-off or covering device G, formed or provided at each end with upwardly-curved extensions $g$, all in substantially the manner and for the purposes hereinbefore described.

In witness whereof I have hereunto set my hand this 27th day of November, 1885.

GEORGE C. AVERY.

In presence of—
R. A. BAILEY,
M. M. MERRILL.